(12) United States Patent
Winebrand

(10) Patent No.: US 9,904,460 B2
(45) Date of Patent: Feb. 27, 2018

(54) METHOD AND SYSTEM FOR DATA TRANSFER WITH A TOUCH ENABLED DEVICE

(71) Applicant: Microsoft Technology Licensing, LLC, Redmond, WA (US)

(72) Inventor: Amil Winebrand, Petach-Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 14/740,303

(22) Filed: Jun. 16, 2015

(65) Prior Publication Data

US 2015/0363067 A1 Dec. 17, 2015

Related U.S. Application Data

(60) Provisional application No. 62/012,435, filed on Jun. 16, 2014.

(51) Int. Cl.
*G06F 3/0488* (2013.01)
*G06F 3/044* (2006.01)
*G06F 3/041* (2006.01)

(52) U.S. Cl.
CPC ............ *G06F 3/0488* (2013.01); *G06F 3/044* (2013.01); *G06F 3/0416* (2013.01)

(58) Field of Classification Search
CPC ....... G06F 3/0488; G06F 3/0416; G06F 3/044
See application file for complete search history.

(56) References Cited

U.S. PATENT DOCUMENTS

| 6,690,156 | B1 | 2/2004 | Weiner et al. |
| 7,292,229 | B2 | 11/2007 | Morag et al. |
| 7,372,455 | B2 | 5/2008 | Perski et al. |
| 7,843,439 | B2 | 11/2010 | Perski et al. |
| 8,481,872 | B2 | 7/2013 | Zachut |
| 2009/0251339 | A1* | 10/2009 | Naruse .................. G06F 1/1626 341/33 |
| 2011/0304583 | A1* | 12/2011 | Kruglick ................ G06F 3/044 345/174 |
| 2012/0220219 | A1* | 8/2012 | Hill ..................... G06K 19/0776 455/41.1 |
| 2013/0147760 | A1 | 6/2013 | Lai et al. |

(Continued)

FOREIGN PATENT DOCUMENTS

| EP | 2107771 | 10/2009 |
| EP | 2975830 | 1/2016 |

(Continued)

OTHER PUBLICATIONS

International Search Report and the Written Opinion dated Sep. 18, 2015 From the International Searching Authority Re. Application No. PCT/IB2015/050534.

(Continued)

*Primary Examiner* — Premal Patel

(57) ABSTRACT

A device includes a display displaying data, a digitizer sensor including a plurality of conductive elements spread across the display and a circuit connected to the plurality of conductive elements. The circuit transmits data displayed on the display via at least one of the conductive elements of the digitizer sensor. The conductive elements of the digitizer sensor are electrically isolated from one another.

32 Claims, 6 Drawing Sheets

(56) References Cited

U.S. PATENT DOCUMENTS

| | | | | |
|---|---|---|---|---|
| 2014/0087658 A1* | 3/2014 | Hou | ................. | G06F 3/041 |
| | | | | 455/41.1 |
| 2014/0199944 A1* | 7/2014 | Ran | ................. | H04B 5/0087 |
| | | | | 455/41.1 |
| 2015/0355708 A1* | 12/2015 | Lee | ................. | G06F 3/041 |
| | | | | 345/173 |

FOREIGN PATENT DOCUMENTS

| | | |
|---|---|---|
| KR | 101398141 | 5/2014 |
| WO | WO 2013/172829 | 11/2013 |
| WO | WO 2014/036859 | 3/2014 |
| WO | WO 2015/193803 | 12/2015 |

OTHER PUBLICATIONS

Gerasenko et al. "Beacon Signals: What, Why, How, and Where?", Computer, XP001128683, 34(10): 108-110, Oct. 1, 2001. p. 108, cols. 1-2, Fig.1.

Written Opinion dated Mar. 18, 2016 From the International Preliminary Examining Authority Re. Application No. PCT/IB2015/054534.

International Preliminary Report on Patentability dated May 6, 2016 From the International Preliminary Examining Authority Re. Application No. PCT/IB2015/054534.

\* cited by examiner

METHOD AND SYSTEM FOR DATA TRANSFER WITH A TOUCH ENABLED DEVICE

RELATED APPLICATION

This application claims the benefit of priority under 35 USC § 119(e) of U.S. Provisional Patent Application No. 62/012,435 filed on Jun. 16, 2014, the contents of which are incorporated herein by reference in their entirety.

BACKGROUND

Touch enabled devices use digitizer sensors for tracking touch input.

Typically, the digitizer sensor includes rows and columns of conductive material layered on an electronic visual display. A user interacts with the digitizer sensor by positioning and moving an object such as stylus and/or a finger over a sensing surface, e.g. a tablet and/or a touchscreen. Location of the object with respect to the sensing surface is tracked by circuitry associated with the digitizer sensor and interpreted as a user command. An electromagnetic stylus can provide input to a digitizer sensor. The electromagnetic stylus operates by emitting an electromagnetic signal at or near the writing tip that can be picked up at locations on the digitizer sensor. Position detection can typically be performed while the object is either touching and/or hovering over the sensing surface. Touch enabled devices that operate with digitizer sensors include mobile phones, tablets, laptops, and the like.

SUMMARY

According to an aspect of some embodiments of the disclosure there is provided a method and system for operating a digitizer sensor of a touch enabled device as an antenna for communicating with another computing device. According to some embodiments of the disclosure, the method and system provides for initiating communication by bringing a touch sensing surface of one device, e.g. a mobile telephone, tablet or laptop, in close proximity to and facing a touch sensing surface of another device. In some exemplary embodiments, the communication provides for data transmission between devices including for example an image, document, email and/or contact. Transferring data by facing one touch screen against another may provide an intuitive user experience of sticking the information displayed on device 105 onto device 100 by touching the display surfaces.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
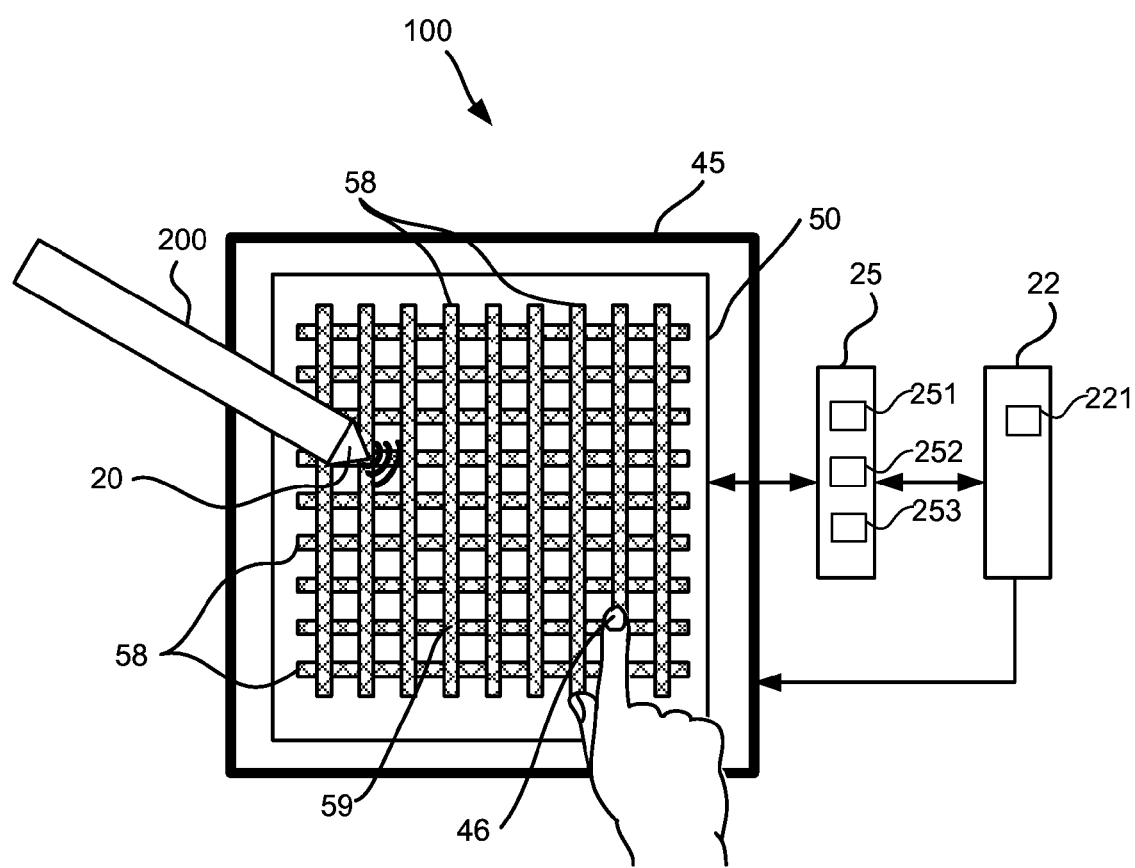
FIG. 1 is a simplified block diagram of an exemplary digitizer system of a touch enabled device in accordance with some embodiments of the present disclosure.

A digitizing system may include a transparent digitizer sensor overlaid on a flat panel display (FPD). The transparent digitizing sensor includes a matrix of vertical and horizontal conductive lines for sensing location of one or more of a stylus and/or a finger. Input to the digitizer sensor includes one or more of electromagnetic (EM) transmission from the stylus touching the sensing surface, and capacitive coupling due to a conductive object such as a finger touching the screen. Location of a finger is detected by triggering one conductive line at a time along one axis of the grid and detecting output in response to each signal applied from a plurality of conductive lines along the other axis. The digitizing system is capable of detecting position of simultaneous occurrences of multiple styluses and/or multiple finger touches.

Mobile phones, tablets, laptops are also known to include Near Field Communication (NFC) capability. NFC is a technology that enables smartphones and the like to establish radio communication with each other while the devices touch or are within range of 10 cm or less. NFC employs electromagnetic induction between two loop antennae to exchange information. A dedicated loop antenna is typically installed in the back and/or as part of the battery case of the NFC enabled device. One advantage of NFC is that NFC doesn't require any kind of manual pairing or device discovery to transfer data. With NFC, a connection is automatically started when another NFC device enters into the 10 cm range. Once in range, the two devices instantaneously communicate and send prompts to the user. Typically, data transfer is initiated by touching the backs of two devices. One disadvantage of NFC is that data transfer rate is typically low, e.g. less than 500 Kbits/sec. The present disclosure relates to a touch enabled device and, more particularly, but not exclusively, to a touch enabled device that detects touch with a grid based capacitive digitizer sensor.

According to some embodiments of the present disclosure, a digitizer sensor is adapted and/or operated as an antenna for establishing communication with another computing device. In some exemplary embodiments, the digitizer sensor of one computing device is operated to establish communication with a digitizer sensor of another computing device. In some exemplary embodiments, the digitizer sensor of one computing device is operated to establish communication with an NFC antenna or the like embedded in another device.

Conductive elements forming the digitizer sensor can be adapted and/or operated to establish close range communication via air with another computing device. Optionally, communication between digitizer sensors is established by bringing two touch sensing surfaces face to face in close range, e.g. up to 1 cm, up to 5 cm, up to 10 cm and/or by touching one touch sensing surface with another touch sensing surface.

According to some embodiments of the present disclosure, one or more row and/or column conductive lines of a grid based digitizer sensor are operated as antennas for communication between computing devices. The plurality of conductive lines that are typically included in a digitizer sensor can be used to provide multi-channel communication that can boost the data transfer rate as compared to known data transfer rates achieved with NFC. Optionally, different multiplexed frequencies are used for multi-channel communication. According to some embodiments of the present disclosure, a plurality of conductive lines, e.g. row and/or column conductive lines are operated simultaneously to transmit a same signal and/or a plurality of different signals. Optionally, using the digitizer sensor in place of an NFC antenna or the like provides for increasing the data transfer rate while also reducing the bill of materials, weight, and/or size of a device.

According to some embodiments of the present disclosure, a digitizer sensor is operated to sense approaching of another computing device. Typically, computing devices are large metal objects and sensing can be similar to digitizer sensing applied when detecting other conductive objects. Typically, the approaching of the computing device can be recognized by its relatively large size and geometrical shape as compared to a finger and/or stylus. Optionally, one of the touching computing devices is operative to detect an orientation and/or location of the other computing device and to select conductive elements for transmitting/receiving information based on the orientation and/or location detected. In some exemplary embodiments, orientation of a transmitting computing device with respect to a receiving computing device is determined based on relative signal strength received on row and column conductive lines of the receiving device.

Optionally, in one example when a mobile phone is positioned over a tablet, the tablet is operative to sense the location of the mobile phone and to selectively activate antennas that overlap the location of the mobile device for communication. In some exemplary embodiments, while sensing that a mobile phone is placed over a tablet, the tablet is operative to adjust displaying information, e.g. prompts to the user in a location that is not obstructed by the mobile device based on location of the mobile phone and/or orientation. Optionally, orientation and/or angle of the transmitting computing device is reported to an application running on the receiving computing device and an image and/or other data is displayed on the receiving computing device in that orientation.

In some exemplary embodiments, a protocol for establishing communication and/or establishing synchronization is similar and/or the same as that used for NFC and/or Bluetooth communication. In some exemplary embodiments, a touch enabled device periodically transmits a beacon signal that can be picked up by another device.

Optionally, a plurality and/or all the conductive lines of the digitizer sensor are operated simultaneously to transmit the beacon signal. According to some embodiments of the present disclosure, a receiving device is operated to periodically detect and/or sample input on a plurality and/or on all the conductive lines of its digitizer sensor to identify the beacon signal. In some exemplary embodiments, the receiving device selects the line or set of lines that provide the strongest signal during a data transfer session, e.g. selects either row or column conductive lines for receiving input once communication is established.

In some exemplary embodiments, touch detection, e.g. finger and/or stylus touch detection is temporarily halted during data communication between devices.

Optionally, the refresh rate for touch detection is reduced during data communication between devices. Optionally, frequencies for transmission or different and/or orthogonal to a frequency used for touch detection and touch detection can occur simultaneously with data transmission.

Referring now to the drawings, FIG. 1 illustrates a simplified block diagram of an exemplary digitizer system of a touch enabled device in according to some embodiments of the present disclosure. According to some embodiments of the present disclosure, a computing device 100 includes a display screen 45 that is integrated with a digitizer sensor 50. In some exemplary embodiments, digitizer sensor 50 is a grid based capacitive sensor formed with row and column conductive strips 58. Typically, conductive strips 58 are electrically insulated from one another and each of conductive strips is connected at least on one end to digitizer circuitry 25.

Typically, conductive strips 58 are arranged to enhance capacitive coupling between row and column conductive lines, e.g. around junctions 59 formed between rows and columns in response to presence of a conductive object.

According to some embodiments of the present disclosure, conductive strips are operative to detect input by stylus 200 transmitting an electromagnetic signal and/or touch of one or more fingertips 46 or other conductive objects. In some exemplary embodiments, the input provided by stylus 200 is one or more signal bursts and/or pulses that are transmitted by the stylus at a defined repetition rate. In some exemplary embodiments, digitizer circuitry 25 manages a synchronization signal for synchronizing signal bursts emitted by stylus 200 with sampling windows for sampling output from sensor 50. Typically, the signal bursts transmitted by stylus 200 is picked up by one or more conductive strips 58 on both the horizontal and vertical axis of the grid. Typically, location of the stylus tip 20 is reported to host 22 associated with the digitizer sensor 50. According to some embodiments of the present disclosure, digitizer circuitry 25 includes dedicated stylus detection circuitry 251 for synchronizing with stylus 200, for processing input received by stylus 200 and/or for tracking coordinates of the stylus.

Optionally, a mutual capacitance detection method and/or a self-capacitance detection method are applied on sensor 50 for sensing interaction with fingertip 46.

Typically, during mutual capacitance and self-capacitance detection, digitizer circuitry 25 sends a triggering pulse and/or interrogation signal to one or more conductive strips 58 of digitizer sensor 50 and samples output from conductive strips 58 in response to the triggering and/or interrogation. In some embodiments, some or all of conductive strips 58 along one axis of the grid based sensor are interrogated simultaneously or in a consecutive manner, and in response to each interrogation, outputs from conductive strips 58 on the other axis are sampled. This scanning procedure provides for obtaining output associated with each junction 55 of the grid based sensor 50. Typically, this procedure provides for detecting coordinates one or more conductive objects, e.g. fingertip 46 touching and/or hovering over sensor 50 at the same time (multi-touch).

According to some embodiments of the present disclosure, digitizer circuitry includes dedicated finger detection circuitry 252 for managing the triggering pulse and/or interrogation signal, for processing input from one or more fingertips 46 and/or for tracking coordinates of one or more fingertips 46.

According to some embodiments of the present disclosure, digitizer sensor 50 is operative to establish communication with a digitizer sensor in another touch enabled computing device and/or with an antenna in another computing device.

According to some embodiments of the present disclosure, digitizer circuitry 25 is operative to transmit a beacon signal on one or more conductive strips to initiate communication and/or synchronize between devices. Optionally, all the conductive strips on the grid are operated simultaneously to transmit the beacon signal.

Optionally, the beacon signal is similar and/or the same as the synchronization signal for synchronizing with stylus 200.

Optionally, a frequency other than a frequency used for stylus synchronization is used. Typically, the amplitude of the beacon signal is selected for detection within 0-1 cm from digitizer sensor 50.

In some exemplary embodiments, mutual capacitance detection (or self capacitance) is applied to detect presence of another computing device within 0-1 cm from digitizer sensor 50. In some exemplary embodiments, digitizer circuitry 25 is operative to identify the computing device based on its size and shape. Optionally, a rectangular shaped conductive object above a pre-defined size threshold is recognized as a computing device as opposed to a finger or other conductive object.

According to some embodiments of the present disclosure, digitizer sensor 50 is operated an antenna array to transmit and receive data over air. According to some embodiments of the present disclosure, digitizer circuitry 25 transmits data over one or more conductive lines 58 of digitizer sensor 50.

In some exemplary embodiments, the plurality of conductive lines 58 is operated for multi-channel communication. Optionally, different multiplexed frequencies are used for multi-channel communication. For example, if 10 conductive lines and/or 10 groups of conductive lines of a digitizer sensor transmit two bits at each of 10 different multiplexed frequencies, a data transfer rate can reach 200 bits per cycle. If for example each cycle is 1.25 msec, the overall data transfer rate would be 20 Kbytes/sec. Typically, grid based digitizer sensors include substantially more than 10 conductive lines. According to some embodiments of the present disclosure, digitizer circuitry includes dedicated data transfer circuitry 253 for managing communication and data transfer with another computing device.

According to some embodiments of the present disclosure, digitizer sensor 50 is operated by digitizer circuitry 25 to both detect electromagnetic signals and perform mutual capacitance detection (and/or self-capacitance detection) over separate sampling windows. Optionally, digitizer circuitry 25 alternates between scanning digitizer sensor 50 for detection of one more fingertips 46 and sampling outputs on both the horizontal and vertical conductive strips 58 for locating a signal transmitted by stylus 200 or identifying a beacon signal for initiating data transfer between devices. In some exemplary embodiments digitizer sensor 50 is operated to detect stylus input and data transfer by a computing device over separate sampling windows. In some exemplary embodiments, digitizer circuitry 25 searches for each of finger touch, stylus input and a request for data transfer between devices during each refresh cycle.

Optionally, finger touch detection and stylus input detection is stopped over a period that the device is transmitting data to another device and resumed after data transmission is terminated and/or completed.

Typically, output from digitizer circuitry 25 is reported to host 22. Typically, the output provided by digitizer circuitry 25 may include one or more of coordinates of writing tip 20 of stylus 200, coordinates of one or more fingertips 46, presence of another computing device and/or data transmitted by another computing device. Typically, digitizer circuitry 25 uses both analog and digital processing to process signals detected with digitizer sensor 50.

Optionally, some and/or all of the functionalities of dedicated circuitry 251, 252 and 253 are integrated in one or more processing units adapted for controlling operation of digitizer sensor 50. Optionally, some and/or all of the functionalities of digitizer circuitry 25, dedicated circuitry 251, 252 and 253 are integrated and/or included in host 22. According to some embodiments of the present disclosure, one or more applications 221 running on host 22 control and/or manage communication between digitizer sensor 50 and the other computing device when present.

Figure 2A:
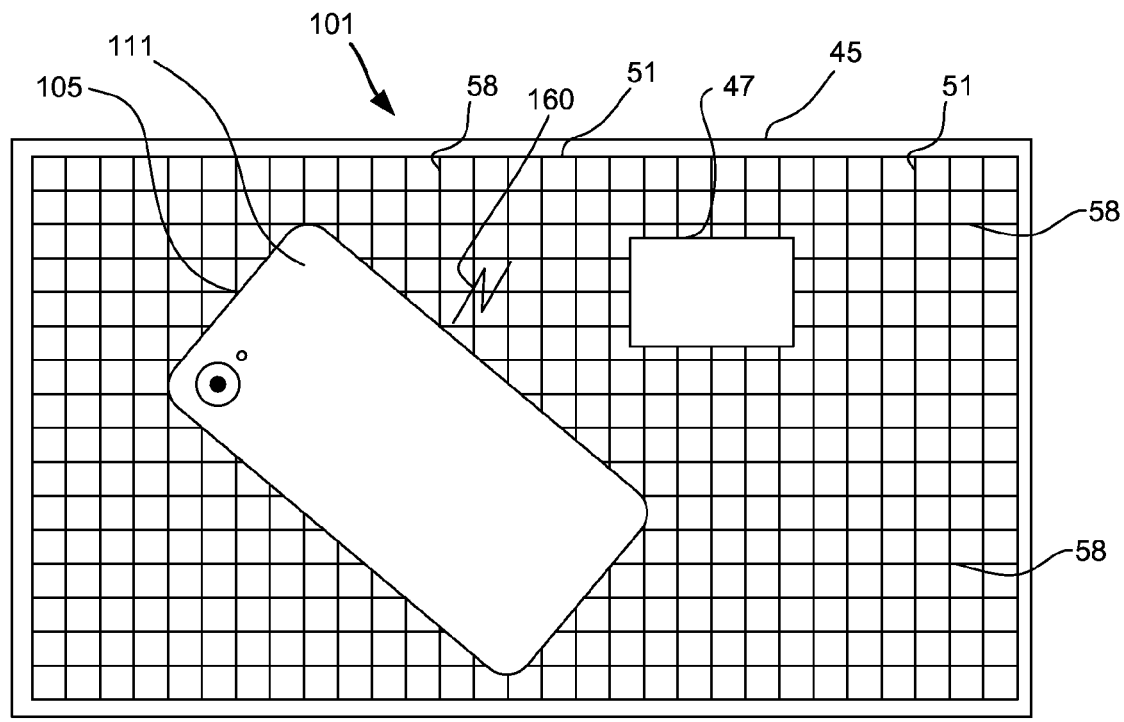
FIGS. 2A and 2B are a simplified schematic drawing showing two touch enabled devices facing each other during close range communication and a front face of one of the touch enabled device respectively both in accordance with some embodiments of the present disclosure.
Figure 2B:
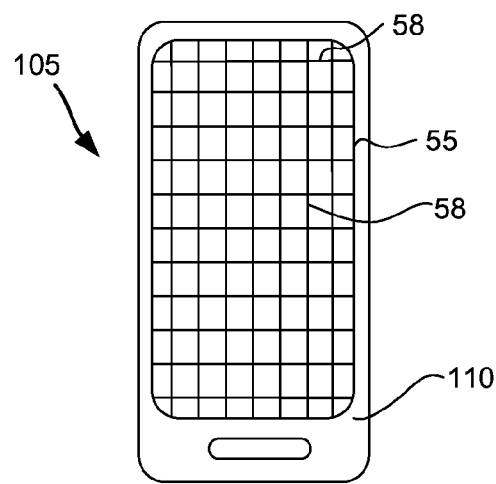

Reference is now made to FIGS. 2A and 2B showing a simplified schematic drawing of two touch enabled devices facing each other during close range communication and a front face of one of the touch enabled device respectively both in accordance with some embodiments of the present disclosure.

According to some embodiments of the present disclosure, a first touch enabled device 105 initiates communication with a second touch enabled device 101 by bringing a digitizer sensor 55 of first device 105 toward a digitizer sensor 51 of second device 101. Optionally, in one example, device 105 is a mobile phone and device 101 is a tablet and/or laptop computer. In some exemplary embodiments, communication is established as front side 110 of device 105, e.g. mobile phone approaches display 45 of device 101, e.g. tablet.

In some exemplary embodiments, device 105 is operative to periodically transmit a beacon signal 160 that can be received by device 101. Optionally, beacon signal 160 is transmitted over air using one or more of conductive strips 58 of digitizer sensor 55. Alternatively, device 101 includes a dedicated antenna, separate from digitizer sensor 55, for transmitting beacon signal 160. Typically, reception of beacon signal 160 initiates a synchronization routine followed by data transmission between the devices. According to some embodiments of the present disclosure, device 101 receives the data via one or more conductive elements 58 of digitizer sensor 55.

In some exemplary embodiments, device 101 detects a presence and/or approach of device 105 by mutual capacitance detection. In some exemplary embodiments, because computing devices typically include a substantial amount of metal, its presence, location and shape is identified during mutual capacitance detection performed by digitizer sensor 101. Optionally, the size as well as the shape as detected by device 101 is used to identify device 105 and initiate communication between the two devices.

Optionally, a large conductive object that is identified as substantially rectangular is identified as a computing device that wants to communicate with device 101. In some exemplary embodiments, device 101, optionally instead of device 105, is operative to transmit beacon signal 160 responsive to detecting the presence of large rectangular conductive object. In some exemplary embodiments, beacon signal 160 transmitted by device 101 is only transmitted over a portion of conductive lines 58 that overlap location of device 105. Typically, reception of beacon signal 160 by device 105 initiates a synchronization routine followed by data transmission between the devices.

According to some embodiments of the present disclosure, identification and location of device 105, is reported to the host 22 (FIG. 1), so that an interaction window 47, e.g. prompts to the user displayed by an application running on device 101 is displayed in a location away from a portion the display that is blocked by device 105 during data transmission.

In some exemplary embodiments, beacon signal 160 is a same signal typically used to query stylus 200 (FIG. 1). Alternatively, beacon signal 160 is a signal other than the signal used to query stylus 200. Optionally, signal frequency and/or modulation of beacon signal 160 is other than that used for querying stylus 200.

According to some embodiments of the present disclosure, once synchronization is established, device 105 transmits and/or requests data from device 101. Typically, one or more applications running on device 105 manage communication and/or data transfer with device 101. Alternatively, device 101 manages communication and/or data transfer with device 105.

According to some embodiments of the present disclosure, data transmission from device 105 is performed substantially simultaneously using a plurality of conductive lines 58 of digitizer sensor 55. Optionally, different multiplexed frequencies are used for multi-channel communication. Typically, performing data transmission substantially simultaneously over a plurality of conductive lines 58 provides for increasing the data transfer rate for data transmission.

According to some embodiments of the present disclosure, device 101 receives the data over a plurality of row and column conductive lines 58 of digitizer sensor 51. Optionally, device 101 is operative to detect one or more conductive lines 58 that provide highest amplitude signal and only those lines are operated to detect input from device 105. Optionally, second device 101 selects only the row conductive lines 58 or only the column conductive lines depending on the orientation of the transmitting lines of device 105 with respect to the receiving lines of device 101.

In some exemplary embodiments, a transmission matrix $Z(f_i)$ defining a relationship between the signal transmitted by device 105, $\underline{S}(f_i)$, to the signal received on device 101, $R(f_i)$, where $f_i$ denotes a frequency of transmission on a conductive line i. In some exemplary embodiments, the relationship is defined by:

$$R(f_i) = Z(f_i) * S(f_i) \qquad \text{Equation (1)}$$

Optionally, the transmission matrix $Z(f_i)$ is used to retrieve the transmitted data content from $R(f_i)$.

In some exemplary embodiments, during calibration, a known signal is transmitted on one transmitting conductive line at a time, e.g. conductive lines of device 105 and signals are measured on all receiving conductive lines, e.g. conductive lines of device 101. Typically, if all entries of $S(f_i)$ are zeroes other than an entry related to one of the conductive lines, the corresponding column of $Z(f_i)$ may be obtained. Typically, all columns of $Z(f_i)$ are obtained by repeating the process for each of the conductive lines used for transmission.

In some exemplary embodiments, if $Z(f_i)$ is a square invertible matrix, then $Z(f_i)^{-1}$ may be obtained and $S(f_i)$ may be estimated as $S(f_i)=Z(f_i)^{-1}*R(f_i)$. In other embodiments of the present disclosure, $Z(f_i)^{-1}$ may be approximated as the "pseudo inverse" matrix of Z. Optionally, the "pseudo inverse" matrix of Z may be calculated by the following equation:

$$Z^* = (Z^H * Z)^{-1} * Z^H \qquad \text{Equation (2)}$$

where $Z^H$ is the conjugate transpose matrix of Z. $S(f_i)$ may then be estimated as $=Z^{**}R(f_i)$. However, the disclosure is not limited to such embodiment and other method of calculating or estimating transmitted signal $S(f_i)$ may be used.

The scheme may be applied symmetrically, wherein each of the devices may transmit information to the other device. Typically, when the same frequencies and antennas are used, the same matrix is used in both directions. Optionally, when different frequencies or antennas are used, a different matrix is calculated, estimated or otherwise obtained.

Figure 3A:
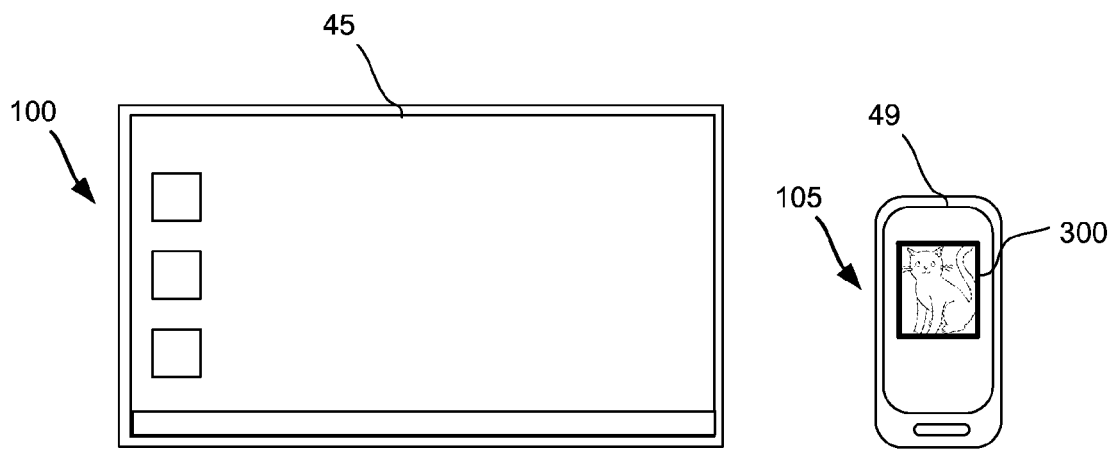
FIGS. 3A, 3B and 3C are simplified illustrations of exemplary steps that a user performs to transfer data from one computing device to another in accordance with some embodiments of the present disclosure.
Figure 3B:
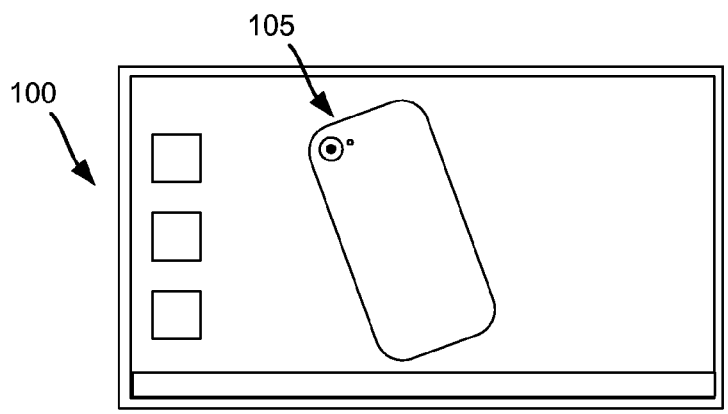
Figure 3C:
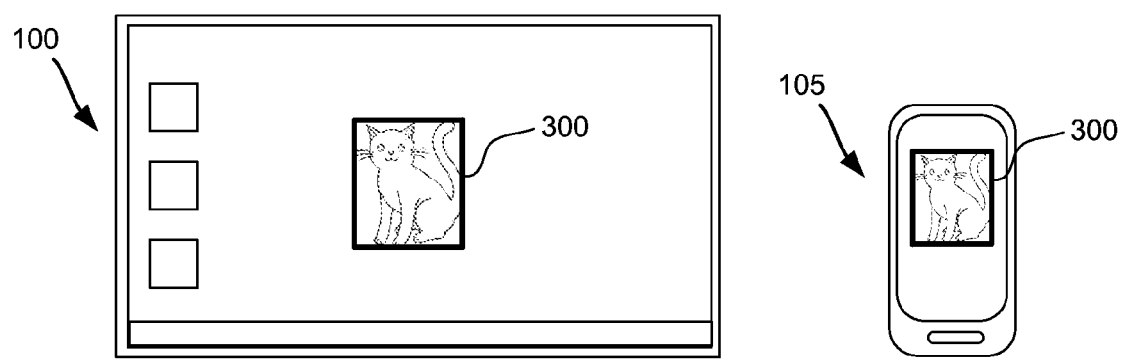

FIGS. 3A, 3B and 3C are simplified illustrations of exemplary steps that a user performs to transfer data from one computing device to another in accordance with some embodiments of the present disclosure. According to some embodiments of the present disclosure, a user displays information 300 on one touch enabled device 105.

Optionally, the information is an image, a document, a link, contact information, an email or the like. According to some embodiments of the present disclosure, if a user wants to transfer that information to another computing device 100, the user brings the display surface of touch enabled device 105 toward the display surface of computing device 100. In some exemplary embodiments, the user provides a command to device 105 to transfer information 300 prior to bringing a display surface of device 105 toward the display surface of device 100. Typically, the command is initiated with an application running on device 105.

According to some embodiments of the present disclosure, as device 105 approaches device 100 and/or when the display surfaces touch, communication between the devices is initiated and/or established. Optionally, an application running on device 105 requests information from device 100 that indicates that device 100 is authorized to receive input from device 105 and data transfer is initiated only after authorization is received.

In some exemplary embodiments of the present disclosure, authorization provides for establishing a secured connection between the two devices. Optionally, a user is required to enter a code and/or otherwise provide authorization before data communication can be established. Optionally, device 100 requests information from device 105 to determine if device 105 is authorized to transfer data to device 100 and data transfer is initiated only after authorization is received. Typically, synchronization is performed prior to data transfer.

According to some embodiments of the present disclosure, once communication is established between device 100 and device 105, information 300 is transmitted to device 100. Typically, information 300 is also displayed on device 100 and/or confirmation is provided on device 100 that the information was received. In some exemplary embodiments, device 100 is a touch enabled device and data is received via touch sensitive display 45. Alternatively, device 100 has a dedicated antenna, e.g. NFC antenna and the information is transmitted from the touch sensitive display 49 of device 105 to the dedicated antenna of device 100. Transmitting information 300 from device 105 to device 100 by bringing the display surfaces in contact or in close proximity provides the user experience that information 300 can be transferred by simply touching device 100 and/or that the user can stick the information displayed on device 105 to device 100 by touching the display surfaces.

According to some embodiments of the present disclosure, distancing device 105 from device 100 terminates the established communication. Optionally, the information transferred is displayed at a location related to a position of device 105 over device 100. Although device 105 is shown as a device that is smaller than device 100, other examples are not limited in this respect. According to some embodiments of the present disclosure, communication can be established between devices of any relative size, e.g. between mobile phones, tablets, phablets, and/or between a personal device and an electronic paying station.

Figure 4A:
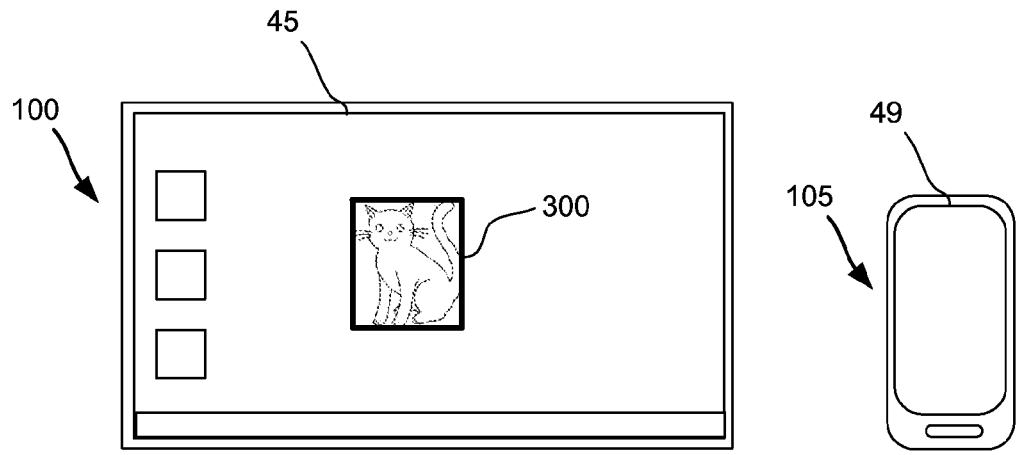
FIGS. 4A, 4B and 4C are simplified illustrations of exemplary steps that a user performs to transfer data from one computing device to another in accordance with some embodiments of the present disclosure.
Figure 4B:
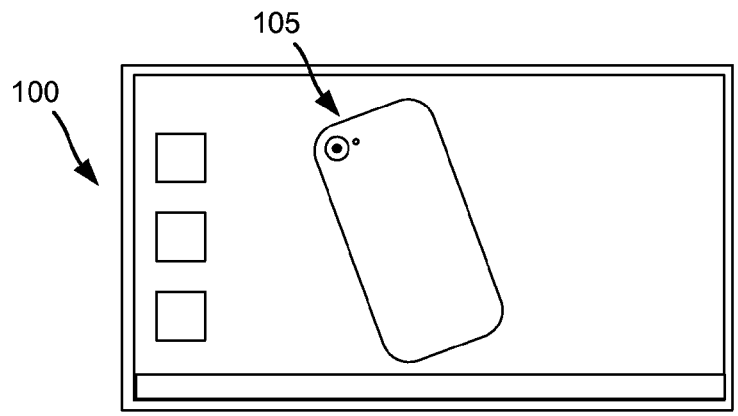
Figure 4C:
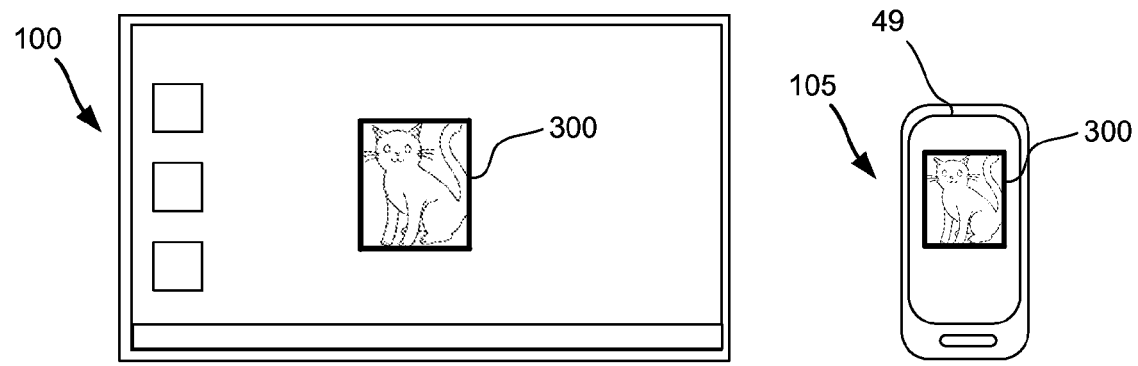

FIGS. 4A, 4B and 4C are simplified illustrations of exemplary steps that a user performs to transfer data from one computing device to another in accordance with some other embodiments of the present disclosure. According to some embodiments of the present disclosure, data transfer is in an opposite direction as that described in reference to FIGS. 3A, 3B and 3C. In some exemplary embodiments, a user displays information 300 on device 100 and optionally provides a command to transfer information 300 to another device 105. Typically, the command is provided with an application running on device 100. According to some embodiments of the present disclosure, the user brings the display surface 49 of device 105 toward the display surface 45 of computing device 100. Optionally, the user positions device 105 over information 300. According to some embodiments of the present disclosure, once communication is established between device 100 and device 105, information 300 is transmitted to device 105.

According to some embodiments of the present disclosure, device 100 is a touch enabled device and the data is transmitted via a digitizer sensor of device 100. Optionally, device 105 is also a touch enabled device and the data is received with a digitizer sensor of device 105. Alternatively, data is received with a dedicated antenna, e.g. an NFC antenna. Typically, communication between device 100 and device 105 is similar to that described in reference to FIGS. 3A, 3B and 3C.

Figure 5:
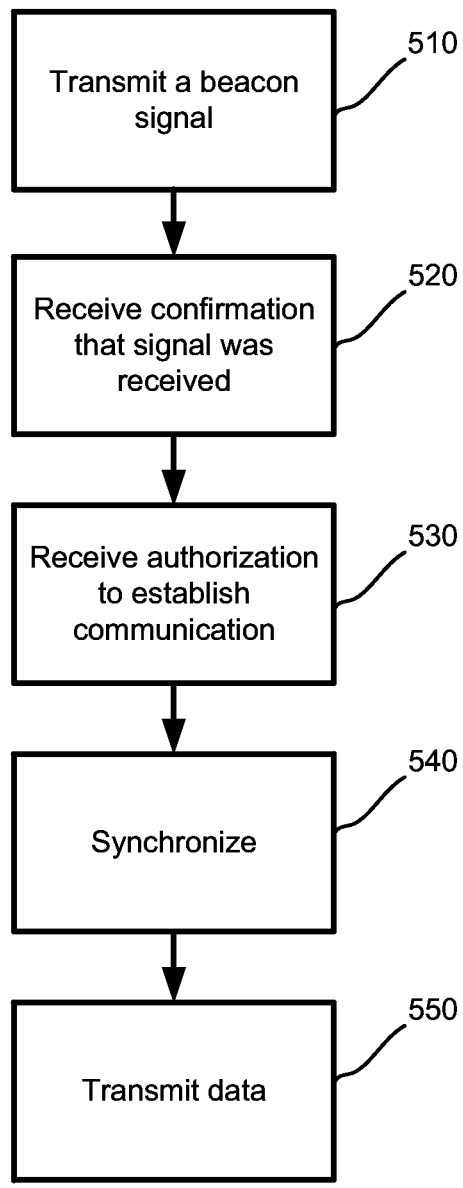
FIG. 5 is a simplified flow chart of an exemplary method for establishing communication between digitizer sensors of two touch enabled devices in accordance with some embodiments of the present disclosure.

Reference is now made to FIG. 5 showing a simplified flow chart of an exemplary method for establishing communication between devices using an antenna of at least one digitizer sensor in accordance with some embodiments of the present disclosure. According to some embodiments of the present disclosure, data communication between two devices, e.g. a transmitting device and a receiving device is initiated by transmission of a beacon signal (block 510). Optionally, the beacon signal is transmitted by conductive lines of a digitizer sensor of one of the devices.

Alternatively, the beacon signal is transmitted by a dedicated antenna, e.g. an NFC or Bluetooth antenna of one of the devices. In some exemplary embodiments, the beacon signal is an AC signal or a train of pulses and the signal frequency or pulse frequency is a predefined dedicated frequency that is recognized by the other device as call to establish communication and/or data transfer.

In some exemplary embodiments, a device is operated to periodically transmit a beacon signal that can be picked up by other device when in close proximity to that device, e.g. within 0-1 cm of the device. In some exemplary embodiments, the beacon signal is transmitted when a digitizer sensor of one of the devices identifies presence of the other device during mutual capacitive detection. Optionally, once a device that is in close proximity is identified, the beacon signal is periodically transmitted. Typically, the required proximity is obtained when a display surface of one device is brought in proximity and/or in contact with a display surface of the other device.

According to some embodiments of the present disclosure, the device that transmits the beacon signal waits to receive confirmation that the beacon signal was received by the other device (block 520). Typically, a response signal is transmitted. Optionally, the response signal is transmitted via one or more conductive lines of a digitizer sensor. According to some embodiments of the present disclosure, one or both of the devices are required to provide proof of authorization to communicate and/or transfer data to the other device (block 530).

According to some embodiments of the present disclosure, data transmission from one of the devices is synchronized with data sampling of the other device (block 540). According to some embodiments of the present disclosure, once synchronization is established, data transmission and/or data exchange is performed (block 550). In some exemplary embodiments, data transmission is performed using a plurality of conductive lines of a digitizer sensor for transmission. Optionally, data is received over a plurality of conductive lines of a digitizer sensor of the receiving device.

Figure 6:
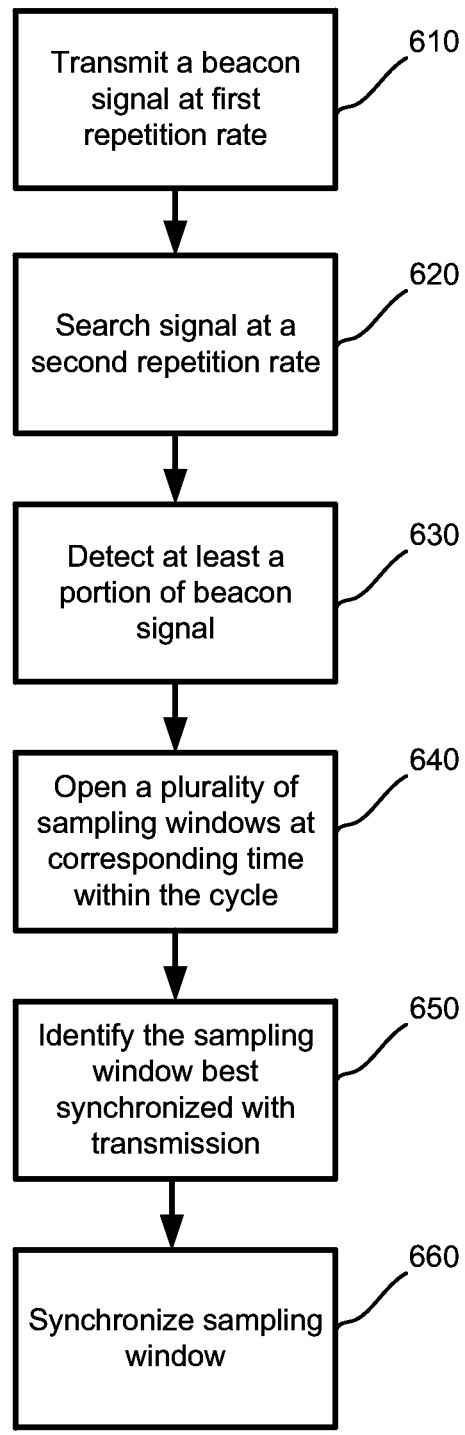
FIG. 6 is a simplified flow chart of an exemplary method for synchronizing transmission between digitizer sensors of two touch enabled devices in accordance with some embodiments of the present disclosure.

Reference is now made to FIG. 6 showing a simplified flow chart of an exemplary method for synchronizing transmission between digitizer sensors of two touch enabled devices in accordance with some embodiments of the present disclosure. According to some embodiments of the present disclosure, a beacon signal is transmitted by a first device at a predefined rate (block 610). According to some embodiments of the present disclosure, a second device searches for the beacon signal at a second repetition rate (block 620). Typically, the second repetition rate is other than an integer multiple of the first repetition rate, so that the beacon signal can be detected after a few transmissions.

Optionally, once at least a portion of beacon signal is detected (block 630), the second devices opens a plurality of overlapping sampling windows at a time in the repeat cycle that beacon signal was detected. Typically, timing of the sampling window that is best synchronized with transmission is selected (block 650).

Optionally, best synchronized timing is determined by interpolating timing between neighboring sampling windows. Typically, once the timing is selected, the sampling window of the second device receiving the beacon signal is synchronized with the beacon signal of the first device (block 660). Typically, synchronization takes between 10 msec to 60 msec.

Although some of the embodiments have described a larger device recognizing a smaller device, other embodiments are not limited in that respect and recognition may also be carried out the other way around, in which the smaller device identifies the larger one and/or between devices that are the same size. Optionally, each of the devices are selected from a group including a tablet computer, a smart phone, a phablet, or the like, in which one of the devices recognizes the presence of the other, and optionally uniquely identifies the other device, such that communication between the devices may be allowed. Bi-directional recognition and identification can take place.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

According to an aspect of some embodiments, there is provided a display for displaying data, a digitizer sensor including a plurality of conductive elements spread across the display, wherein the conductive elements are electrically isolated from one another, a circuit connected to the plurality of conductive elements and configured to transmit data displayed on the display via at least one of the conductive elements.

Optionally, the circuit is configured to operate the digitizer sensor for detecting proximity of another device and to initiate transmission of the data based on detecting the proximity.

Optionally, the circuit is configured to periodically operate the digitizer sensor for mutual capacitive detection and to detect the proximity based the mutual capacitive detection.

Optionally, the circuit is configured to detect a beacon signal transmitted by another computing device and to initiate transmission of the data based on detecting the beacon signal.

Optionally, the circuit is configured to simultaneously transmit different portions of the data over different conductive elements from the plurality.

Optionally, the circuit is for operating the plurality of conductive elements for multi-channel communication.

Optionally, the circuit is configured to use multiplexed frequencies for the multi-channel communication.

Optionally, the plurality of conductive elements includes row conductive lines and column conductive lines.

Optionally, the circuit is configured to select either the row conductive lines or the column conductive lines to transmit the data.

Optionally, the circuit is configured to operate the digitizer sensor for receiving transmission from a digitizer sensor of another device.

Optionally, the circuit is configured to select conductive elements for receiving transmission from the digitizer sensor of another device.

Optionally, the circuit is configured to switch between operating the digitizer sensor for mutual capacitive detection and for transmission of the data displayed on the display.

Optionally, the circuit is configured to switch between operating the digitizer sensor for tracking coordinates of an object interacting with the display and for transmission of the data displayed on the display.

Optionally, the object is a stylus, finger or conductive token.

According to an aspect of some embodiments, there is provided a method including: displaying data on an display of a first device, the display integrated with a digitizer sensor, the digitizer sensor including a plurality of conductive elements that are electrically isolated from one another; detecting proximity between the first device and a second device; and operating the digitizer sensor as an antenna to transmit the data displayed on the first device to the second device via air based on detecting the proximity.

Optionally, the method includes simultaneously transmitting different portions of the data over different conductive elements of the plurality.

Optionally, the plurality of conductive elements is for multi-channel communication with the second device.

Optionally, different multiplexed frequencies are used for the multi-channel communication.

Optionally, the method includes simultaneously transmitting same portions of the data over different conductive elements of the plurality.

Optionally, the plurality of conductive elements includes row conductive lines and column conductive lines arranged in a grid.

Optionally, the method includes selecting the row conductive lines or the column conductive lines as antennas to transmit the data.

Optionally, the detecting proximity is based on mutual capacitive detection.

Optionally, the detecting proximity is based receiving a beacon signal transmitted by the second device.

Optionally, the data transmission of the data is initiated while the display of the first device faces a display of the second device.

Optionally, the method includes operating the plurality of conductive elements of the digitizer sensors at antennas for receiving data transmitted by the second device.

Optionally, the plurality of conductive elements includes row conductive lines and column conductive lines arranged in a grid and including selecting the row conductive lines or the column conductive lines as antennas for receiving the data transmitted by the second device.

Optionally, the method includes synchronizing the second device with the first device.

Optionally, the method includes verifying authorization of the second device to receive the data for transmission.

Optionally, the method includes verifying authorization of the first device to transmit data to the second device.

Optionally, the method includes switching between operating the digitizer sensor for mutual capacitive detection and for transmission of the data displayed on the display.

Optionally, the method includes switching between operating the digitizer sensor for tracking coordinates of an object interacting with the display and for transmission of the data displayed on the display.

Optionally, the object is a stylus, finger or conductive token.

What is claimed is:
1. A device comprising:
a display configured for displaying data;
a digitizer sensor including a plurality of conductive elements spread across the display, wherein the conductive elements are electrically isolated from one another; and a circuit connected to the plurality of conductive elements and configured to:
sense proximity of a second device based on the digitizer sensor;
detect an orientation of the second device with respect to the device based on output from the digitizer sensor;
select at least one of the plurality of conductive elements as an antenna for transmitting data displayed on the display to the second device based on the detected orientation;
transmit the data displayed on the display via the at least one of the plurality of conductive elements.

2. The device of claim 1, wherein the circuit is configured to operate the digitizer sensor for detecting proximity of the second device and to initiate transmission of the data based on detecting the proximity.

3. The device of claim 2, wherein the circuit is configured to periodically operate the digitizer sensor for mutual capacitive detection and to detect the proximity based the mutual capacitive detection.

4. The device of claim 1, wherein the circuit is configured to detect a beacon signal transmitted by another computing device and to initiate transmission of the data based on detecting the beacon signal.

5. The device of claim 1, wherein the circuit is configured to simultaneously transmit different portions of the data over different conductive elements from the plurality.

6. The device of claim 1, wherein the circuit is configured for operating the plurality of conductive elements for multi-channel communication.

7. The device of claim 6, wherein the circuit is configured to use multiplexed frequencies for the multi-channel communication.

8. The device of claim 1, wherein the plurality of conductive elements includes row conductive lines and column conductive lines.

9. The device of claim 8, wherein the circuit is configured to select either the row conductive lines or the column conductive lines to transmit the data based on the detected orientation.

10. The device of claim 1, wherein the circuit is configured to operate the digitizer sensor for receiving transmission from a second digitizer sensor of the second device.

11. The device of claim 10, wherein the circuit is configured to select conductive elements for receiving transmission from the second digitizer sensor of the second device.

12. The device of claim 1, wherein the circuit is configured to switch between operating the digitizer sensor for mutual capacitive detection and for transmission of the data displayed on the display.

13. The device of claim 1, wherein the circuit is configured to switch between operating the digitizer sensor for tracking coordinates of an object interacting with the display and for transmission of the data displayed on the display.

14. The device of claim 13, wherein the object is a stylus, finger or conductive token.

15. A method comprising:
displaying data on a display of a first device, the display integrated with a digitizer sensor, the digitizer sensor including a plurality of conductive elements that are electrically isolated from one another;
detecting proximity between the first device and a second device based on output from the digitizer sensor;
detecting an orientation of the second device with respect to the first device based on the output from the first digitizer sensor;
selecting at least one of the plurality of conductive elements as an antenna for transmitting data displayed on the display to the second device based on the detected orientation; and
operating the digitizer sensor the antenna to transmit the data displayed on the first device to the second device via air based on detecting the proximity.

16. The method of claim 15, comprising simultaneously transmitting different portions of the data over different conductive elements of the plurality.

17. The method of claim 15, wherein the plurality of conductive elements is configured for multi-channel communication with the second device.

18. The method of claim 17, wherein different multiplexed frequencies are used for the multi-channel communication.

19. The method of claim 15, comprising simultaneously transmitting same portions of the data over different conductive elements of the plurality.

20. The method of claim 15, wherein the plurality of conductive elements includes row conductive lines and column conductive lines arranged in a grid.

21. The method of claim 20, comprising selecting the row conductive lines or the column conductive lines as antennas to transmit the data.

22. The method of claim 15, wherein the detecting proximity is based on mutual capacitive detection.

23. The method of claim 15, wherein the detecting proximity is based receiving a beacon signal transmitted by the second device.

24. The method of claim 15, wherein the data transmission of the data is initiated while the display of the first device faces a second display of the second device.

25. The method of claim 15, comprising operating the plurality of conductive elements of the digitizer sensors at antennas for receiving data transmitted by the second device.

26. The method of claim 25, wherein the plurality of conductive elements includes row conductive lines and column conductive lines arranged in a grid and comprising selecting the row conductive lines or the column conductive lines as antennas for receiving the data transmitted by the second device based on the orientation.

27. The method of claim 15, comprising synchronizing the second device with the first device.

28. The method of claim 15, comprising verifying authorization of the second device to receive the data for transmission.

29. The method of claim 15, comprising verifying authorization of the first device to transmit data to the second device.

30. The method of claim 15, comprising switching between operating the digitizer sensor for mutual capacitive detection and for transmission of the data displayed on the display.

31. The method of claim 15, comprising switching between operating the digitizer sensor for tracking coordinates of an object interacting with the display and for transmission of the data displayed on the display.

32. The method of claim 31, wherein the object is a stylus, finger or conductive token.

* * * * *